Sept. 13, 1932.  W. NOBLE  1,876,735

HYDRAULIC VALVE ACTUATING MECHANISM

Filed June 26, 1928

Inventor.
Warren Noble.
By Stanley Lightfoot
Attorney

Patented Sept. 13, 1932

1,876,735

UNITED STATES PATENT OFFICE

WARREN NOBLE, OF DETROIT, MICHIGAN

HYDRAULIC VALVE ACTUATING MECHANISM

Application filed June 26, 1928. Serial No. 288,482.

This invention relates to hydraulic valve actuating mechanisms and has for its object to provide an automatic air relief or bleed valve for such mechanism which will open for bleeding or air relief under normal pressures such as that resulting from a fluid supply pump operating to maintain a column of fluid in a hydraulic valve mechanism, and which will close under the influence of heavier pressures such as result when the hydraulic valve mechanism is in operation and the hydraulically operated valve is open. Under the latter condition hydraulic pressure in the mechanism may reach several hundred pounds whereas the supply pressure may be, say 20 or 30 pounds. Thus the air relief or bleed valve is intended to permit relief flow from the hydraulic valve actuating mechanism at such lower pressure and prevent relief flow at such higher pressure.

A better understanding of the invention will be had with reference to the accompanying drawing wherein one of my improved valve actuating mechanisms is shown, by way of example, and in which Figure 1 is a sectional view thru a hydraulic valve system, distorted for purposes of clarity.

Figures 1, 2, 3:
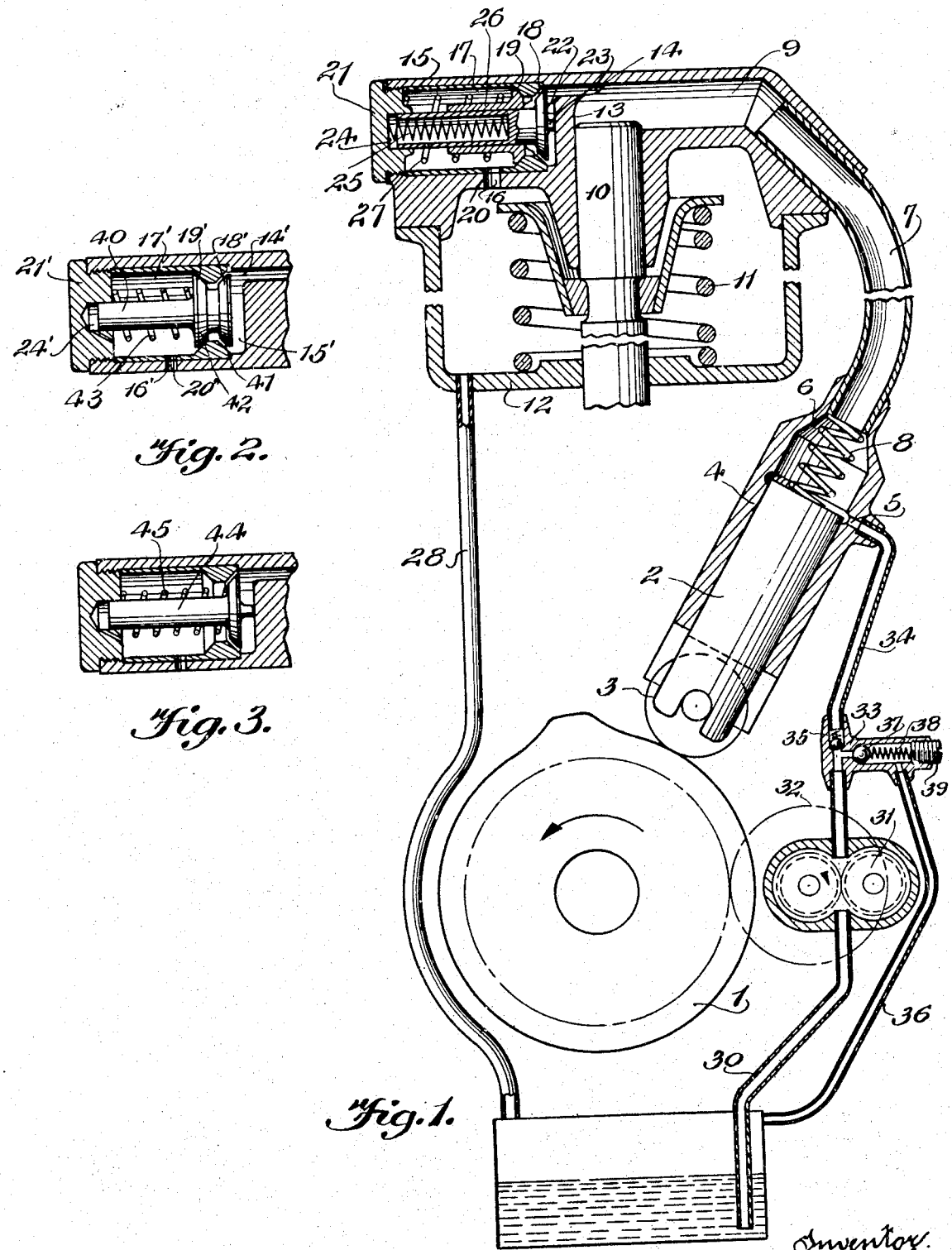
Figure 2 shows a modification of the relief valve of Figure 1.
Figure 3 shows a further modification of the relief valve.

Referring more particularly to the drawing:

Numeral 1 refers to an engine cam adapted to operate a plunger 2 through contact with a roller 3 carried by the plunger. A cylinder 4 having a fluid inlet port 5 contains plunger 2 in sliding engagement and has at its upper end, above the maximum elevation point of said plunger, a reduced portion 6 into which is fixedly positioned a fluid line 7. Abutting the end of line 7 and the top of plunger 2 is a spring 8 which aids in returning plunger 2 to its normal position after each actuation by cam 1. The upper end of line 7 is fixedly positioned in a chamber 9 fashioned in the cylinder head of engine and which has projecting therein a plunger or valve stem head 10 of a puppet valve. The puppet valve may be returned after actuation in the conventional manner by a spring 11 abutting spring housing 12 and collar 13 on said valve.

Chamber 9 is closed at its end by a wall 13, which has a passageway 14 through its topmost portion which is also the region of air accumulation. Passage 14 communicates with a cylindrical portion 15 having a port 16 thru a wall thereof and a cylindrical member 17 carrying a plurality of valve seats 18 and 19 fitted therein. Cylinder 17 has a port 20 through the side thereof overlying port 16 and held in position by a lockscrew 21 inserted in the end of cylinder 15.

Seated on valve seat 18 is a valve 22 having a stop 23 thereon to abut wall 13 and prevent excess outward displacement of the valve 22 from its seat. The stem of valve 22 is in the form of a hollow cylinder and the end thereof slidably engages a cylindrical cut-out portion 24 of screw 21, utilizing said cut-out portion as a guide. Within the hollow stem of valve 22 I provide a spiral spring 25 which abuts screw 21 and which is of such strength as to retain valve 22 in open position against the fluid pressure of the supply pump, or of plunger under motion from the engine starter, but which will permit valve 22 to promptly close under the greater pressure set up by plunger 2 under a cam impulse after the starting of the engine.

For seat 19 I provide a valve 26 having a hollow cylindrical interior which is slidably fitted over the stem of valve 22. Valve 26 is held seated by a spring 27 of less strength than spring 24, so that it may open under pressure from the fluid supply pump. Thus, a bleed for air and oil is provided from the highest point in the system which will permit a free flow therethru at all times except during periods of puppet valve actuation. Air and oil which flows past the relief valves escapes thru ports 16 and 20 into casing 12, where it is returned by a pipe line 28 to the main source of fluid supply 29.

Leading upwardly from the fluid reservoir 29 which may be the engine oil pump, is a pipe line 30 leading into a casing embodying a gear pump 31. A pump outlet line 32 leads into a casing 33 having two outlets. One of said outlets is by way of a pipe line 34 which leads into casing 2 substantially in the plane of the top of the plunger 2, when the plunger is in normal position, and supplies the hydraulic system with fluid. A non-return check valve 35 prevents back flow during periods of engine idleness. The other outlet from casing 35 is by way of a pipe line 36 which leads back into the reservoir 29 and which is controlled by a check valve 37 having a spring 38 adjustably compressed by a screw 39 which is of a strength less than that of springs 24 but more than that of the spring in check valve 35. Thus during ordinary running conditions valve 37 may remain entirely inoperative for long periods of time. But if the pump 31 should deliver sufficient pressure to otherwise close valve 22 and hence tend to open the puppet valve, valve 37 will first unseat thereby relieving the pressure on the system.

Figure 2 shows a modification of relief valve 19—20 of a somewhat simpler design. In this type, an outlet passageway 14' leads into a cylindrical portion 15' which has positioned therein a double valve seat having cylindrical sidewalls 17 for engagement by a screw 21' whereby the seat is rigidly held in such a position as to permit a port 16' thru the walls thereof to overlie a port 20' thru the walls of cylinder 15. Supported in a cylindrical cutout guide portion 24' of screw 21' is a valve stem 40 having rigidly attached thereto two valve heads 41 and 42 for engagement by valve seats 18' and 19'. A spring 43 in abutting engagement with screw 21' retains valve head 42 seated. Spring 43 is of such strength as to be influenced by fluid pressure from gear pump 3 and by plunger pressure in starting, but not to such extent as to permit the seating of head 41 on its seat. The strength is such, then, to permit prompt seating of valve head 41 under pressure greater than that of the supply pump as under plunger action under a cam impulse after engine operation and when plunger 2 moves slowly under actuation by a starting means both valve heads will be unseated so that a flow may be had therepast and out thru ports 16' and 20'.

Figure 3 shows a still simpler modification in which I use essentially the valve of Figure 1 omitting valve 26. In this form I provide a valve 44 whose normal position is unseated under the action of a spring 45 of such strength as to be unaffected by pressure from a supply pump or to plunger pressure during starting but immediately responsive to pressures in excess thereof. I thus provide a means for a continuous bleed from the region of air accumulation except during periods of puppet valve actuation.

An important feature of the relief valves also resides in the fact that they are so insertable in the casing as to be readily dismounted for replacement or repair without disturbance or removal of any other part of the engine.

Herein and in the claims, the term "operating pressure" is intended to refer to the high pressure on hydraulic fluid in the casing when the puppet valve is open and the hydraulic valve operating mechanism may be considered as active.

While I have specifically described my invention with reference to the drawing which are exemplary only of the wide field of modifications which my broad idea will immediately open up, I desire to be limited in the application and construction thereof only by the scope of the appended claims.

Further the invention resides in the bleed or relief valve the form of inlet 5 and the type of plunger 2 are more or less diagrammatic simply in order to facilitate description of the operation of the mechanism.

What I claim is:

1. In a hydraulic actuator, a hydraulic fluid casing having a bleed outlet leading from a point of air accumulation therein, a valve closing said outlet under the influence of valve operating pressure in said casing, and means slightly unseating said valve when pressure in said casing is relatively low.

2. In a hydraulic valve gear, a hydraulic fluid casing having an outlet therefrom, a double valve closing said outlet during periods of relatively high and relatively low pressure in said casing.

3. In a hydraulic valve gear, a hydraulic fluid casing having an outlet from a region of air accumulation, a double valve having one head closing said outlet under the influence of valve operating pressure in said casing and another head closing said outlet during periods of relatively low pressure in said casing.

4. The combination as set forth in claim 3, both of said valve heads unseating during the periods of pressure in said casing less than puppet valve actuating pressure and greater than the periods of relatively low pressure in said casing.

5. In an engine, a hydraulic valve system, an outlet from said system, means closing said outlet during actuation periods of said system, and means closing said outlet during periods of engine idleness, both of said means uncovering said outlet during periods of fluid replenishment of said system.

6. In a hydraulic valve gear, a fluid casing having an end wall and an outlet from the top of said wall, a relief valve in said outlet outwardly of said wall, means for unseating said valve during periods of low pressure in said casing and means for limiting the amount of displacement of said valve toward said wall.

7. In a hydraulic valve gear, a hydraulic fluid casing an outlet from said casing into a spillway, a cylindrical member having a valve seat thereon inserted in said spillway and means demountable from the exterior of said casing for retaining said cylindrical member in fixed position.

8. In a hydraulic valve gear, a fluid casing having an outlet from a region of air accumulation, a detachable valve seat in said outlet having extended walls and a drain port thru said walls overlying a corresponding port in said casing, a valve for said valve seat, a locknut for said valve seat independently detachable from the exterior of said casing, a valve stem guide in said nut and spring means abutting said nut and urging said valve outwardly therefrom.

9. In a hydraulic valve gear, a fluid casing having an outlet passage from a region of air accumulation therein, a demountable cylinder having a double valve seat inserted in said outlet passage, a locknut for said cylinder having a valve guide therein, a valve stem in said guide having a valve head for seating on one of said valve seats, a second valve embracing the stem of said first valve and seating on the other of said valve seats and spring means of different strength for each of said valves.

10. The combination as set forth in claim 9, wherein the spring means for said first mentioned valve is the stronger and urges said valve away from its seat and the other of said springs urges said second valve towards its seat.

11. In a hydraulic valve gear, a hydraulic fluid casing, an inlet and an outlet for said casing, a relief valve in said outlet, a fluid pressure means for said inlet, and a pressure relief valve in the inlet passage more sensitive to pressure than said first mentioned valve.

12. In a hydraulic valve gear, a hydraulic fluid casing, an outlet from said casing, a double valve in said casing, a fluid supply line to said casing having a pressure relief valve therein, one member of said double valve being more sensitive to fluid pressure than said pressure relief valve, the other member of said double valve being less sensitive to pressure than said pressure relief valve.

13. In an engine, a hydraulic valve gear having a hydraulic fluid casing, an outlet for said casing having a double valve therein, one member of said valve seating during periods of engine idleness, the other member of said valve being inserted during periods of engine idleness, said seated member being adapted to open under slight pressure in said casing, said unseated member being adapted to seat under greater pressure in said casing.

14. In a hydraulic valve gear operable under pulsating pressures, a fluid chamber adapted for communication with a source of fluid pressure supply whereby a scavenging flow of fluid thru said chamber is initiated, an actuating and an actuated plunger exposed to the fluid in said chamber for inducing and receiving pulsations of said fluid, an outlet passage from a region of air accumulation in said chamber and an outlet valve controlling bleeding of air thru said passage, said valve closing upon a rise in pressure of fluid in said chamber beyond the predetermined amount employed for scavenging.

15. In an engine, the combination of valve operating mechanism, valve mechanism, a chamber into which portions of said mechanism project, a body of fluid in the chamber for effecting operation of the valve mechanism upon actuation of the valve operating mechanism, said chamber being provided with a fluid inlet and a fluid outlet, valves for said inlet and outlet, and means for causing a flow of fluid under pressure from said inlet to said outlet to replenish the fluid supply, said valves being normally open for bleeding air during periods of normal scavenging pressure on said fluid and closed during periods of pressure increase in said chamber beyond said scavenging pressure.

16. In a hydraulic valve gear operable under pulsating pressures, a fluid chamber adapted for communication with a source of fluid pressure supply whereby a scavenging flow of fluid thru said chamber is initiated, an actuating and an actuated plunger exposed to the fluid in said chamber for inducing and receiving pulsations of said fluid, an outlet passage from a region of air accumulation in said chamber and an outlet valve controlling bleeding of air thru said passage, said valve being normally open under scavenging pressure and being closed by the fluid upon a rise in pressure of said fluid within said casing beyond the predetermined amount employed for scavenging.

In testimony whereof I affix my signature.

WARREN NOBLE.